United States Patent [19]

Lachman et al.

[11] Patent Number: 5,244,852
[45] Date of Patent: Sep. 14, 1993

[54] MOLECULAR SIEVE-PALLADIUM-PLATINUM CATALYST ON A SUBSTRATE

[75] Inventors: Irwin M. Lachman; Mallanagouda D. Patil, both of Corning; Louis S. Socha, Jr., Painted Post; Srinivas H. Swaroop, Painted Post; Raja R. Wusirika, Painted Post, all of N.Y.

[73] Assignee: Corning Incorporated, Corning, N.Y.

[21] Appl. No.: 857,738

[22] Filed: Mar. 26, 1992

Related U.S. Application Data

[63] Continuation of Ser. No. 587,484, Sep. 19, 1998, abandoned, which is a continuation of Ser. No. 273,214, Nov. 18, 1988, abandoned.

[51] Int. Cl.$^5$ .............................................. B01J 29/06
[52] U.S. Cl. .................... 502/66; 423/213.5; 423/239.2; 423/247
[58] Field of Search ................ 502/66, 74; 423/213.5, 423/239, 247

[56] References Cited

U.S. PATENT DOCUMENTS

| | | | |
|---|---|---|---|
| 4,976,941 | 12/1990 | Tsunoda et al. | 423/247 |
| 5,047,381 | 9/1991 | Beebe | 423/213.5 |
| 5,078,979 | 1/1992 | Dunne | 423/213.5 |

FOREIGN PATENT DOCUMENTS 3818  9/1979  European Pat. Off. ......... 423/213.5

Primary Examiner—Carl F. Dees
Attorney, Agent, or Firm—Angela N. Nwaneri

[57] ABSTRACT

A catalyst system for the oxidation of hydrocarbons, carbon monoxide, and the reduction of nitrogen oxides is provided. The unique synergy of the catalyst system, a combination of molecular sieves and noble metals, provides a system that partially or entirely replaces the need for rhodium as a catalyst in three way catalyst systems.

20 Claims, 3 Drawing Sheets

MOLECULAR SIEVE-PALLADIUM-PLATINUM CATALYST ON A SUBSTRATE

This is a continuation application of U.S. Ser. No. 07/587,484 filed Sep. 19, 1990, now abandoned, which is a continuation of U.S. Ser. No. 07/273,214 filed Nov. 18, 1988 now abandoned.

BACKGROUND OF THE INVENTION

This invention is directed to the partial or entire replacement of rhodium as a catalyst in a catalyst system, such as a three way catalyst (TWC) system which can be advantageously used for automotive emission control. The catalysis of interest is for the conversion of hydrocarbons, nitrogen oxides, and carbon monoxide into their nontoxic gaseous counterparts. The catalyst system of the present invention involves mechanisms wherein intermediate products of the initially catalyzed reactants may be further catalyzed to form carbon dioxide, nitrogen gas, and water.

The conversion of noxious exhaust fumes is a problem that has long followed the trail of the automotive industry. In recent times efforts have been expended to decrease the extent of toxic gases emitted from exhaust systems through the use of catalytic reactions. A problem long-felt in the industry had been the need for a catalytic system which was able to cope with the potpourri of reduced and oxidized forms of carbon and nitrogen. To this end, TWC catalyst systems have evolved to enable conversion of the reaction products of internal combustion engines.

A common problem to other organically fueled energy conversions, such as coal or oil fired power plants, is the production of the same kinds of pollutants found in the automotive industry. Therefore, a system that can be adapted to automotive exhaust gases can fittingly be adapted to industrial smoke stacks or organically fueled power sources.

One component in the TWC catalyst system that has been found effective for the catalytic reduction of nitrogen oxides is rhodium. Unfortunately, rhodium is a rare and expensive resource. Catalyst systems have been researched, therefore, in an effort to replace or substitute for rhodium. "The Use of Molybdenum in Automotive Three-Way Catalysts", by Gandhi et al, printed in ACS Symposium Series, No. 178, 1982, discusses the benefits of substituting molybdenum for some of the rhodium in a TWC catalyst system. The obvious benefit to a decreased use of rhodium is the significant decrease in the price of the catalyst system. A substitute for rhodium, therefore, is of paramount importance to some very large industries.

U.S. Pat. No. 4,678,770 discloses the use of platinum and/or palladium, rare earth oxides, alumina, and rhodium. This combination is used as a TWC catalyst system.

U.S. Pat. No. 4,297,328 discloses the use of copper, copper ions, and zeolites in a TWC catalyst system. Platinum and palladium are not used in this system.

The present invention substitutes therefor and/or replaces partially or entirely rhodium in a catalyst system, maintaining in the system palladium and/or platinum. It has been discovered through the use of molecular sieves, such as zeolites, and, singly or a combination of, platinum and/or palladium, that this combination of catalysts performs equally well as the rhodium/platinum and/or palladium metal system.

SUMMARY OF THE INVENTION

A catalyst system comprised of molecular sieves, platinum and/or palladium, optionally binders, and combinations thereof and therebetween which catalyze exhaust gases from organically fueled energy consumers, are all affixed or integrated into and/or onto a substrate wherein said system is placed in a stream comprised substantially of nitrogen oxides, hydrocarbons, and carbon oxides for conversion to a stream comprised substantially of nitrogen gases, carbon dioxide and water.

The family of molecular sieves can be useful for this purpose. That family consists of zeolites, microporous aluminum phosphates, and other species known to those skilled in the art. The preferred embodiments of molecular sieves are any one of the species known as zeolites. The zeolites of interest can be selected from the group of zeolites such as mordenite, ultra-stable Y, H-ferrierite, H-offretite, HL powder, ZSM-5, beta-zeolites, ZSM-8, ZSM-11, ZSM-12, Hyper Y, preferably silicalite, and any of the natural zeolites including erionite, clinoptilolite, chabazite, and phillipsite. These can be washcoated on substrates using alumina binder.

Preferably, zeolites and an alumina binder are mixed in a slurry form. This form can contain gamma alumina or other high surface area aluminas or their precursors. In actual practice of the most preferred embodiments, additional oxides, such as alkaline earth and rare earth oxides, would be added to improve thermal stability. The binder can be selected from the group consisting of transition aluminas, such as pseudoboehmite alumina, hydrated aluminas, hydrolyzed aluminum alkoxide, such as isopropoxide, and aluminum chlorhydrate, or other permanent binders such as silica, alumina, zirconia, spinel, silica, or titania. The preferred transition alumina is pseudoboehmite alumina which has been fired in the range of 500° to 600° C. for conversion to gamma alumina.

A substrate structure, such as a honeycomb, is coated with the slurry. The coating may be either by immersion or dipping. Normally a washcoat loading of 5–30% by weight is applied in a single dip coating of the substrate. The combined slurry treated substrate is heat treated in the temperature range of 500° to 600° C.

The next step is to apply the noble metal catalyst. A solution of a noble metal salt is applied to the already treated substrate. By impregnation the noble metal precursor species is introduced on the high surface area alumina. Interestingly and fortuitously, the noble metal precursors do not substantially site on the already present zeolite. This advantageous result provides a segregated system, or a system wherein said molecular sieves and noble metals are positionally juxtaposed to each other, wherein the zeolites are available to catalyze the reactant consistent with zeolitic properties. Additionally, the noble metals are then available to catalyze reactions most suited to noble metal properties.

Those skilled in the art can appreciate that the above recited process of applying molecular sieves and noble metals to the substrate structure can be varied to provide catalyst systems of equal merit. For example, the noble metals can first be dispersed on gamma alumina or a precursor high surface area alumina, heat treated, subsequently mixed with the molecular sieve treated slurry and then applied to the substrate. Another variation is to first coat the substrate with the noble metal onto a high surface area alumina and then apply the molecular sieve slurry.

Another method of providing zeolites to the substrate is by seeding the substrate prior to extrusion into the honeycomb form and then treating the seeded substrate to grow zeolites. In U.S. Patent Application, "Method of Crystallizing a Zeolite on the Surface of a Monolithic Ceramic Substrate", Ser. No. 113,475, filed Oct. 28, 1987, (U.S. Pat. No. 4,800,187) incorporated herein by reference as filed, is disclosed several methods of treating a ceramic substrate with zeolites.

It is new to the art to treat and/or integrate sintered metal powder substrates with zeolites. It is here disclosed that the methods of crystallizing molecular sieves, such as zeolites, can be advantageously effected by the same methods used for ceramics. This includes activating the sintered metal powder surface with acids, bases, and by oxidizing in air to provide compatible surface oxides prior or during treatment with the zeolite. Examples of compatible surface oxides are aluminum oxides, titanium oxides, and silicon oxides. Additionally, the molecular sieve component and/or seeds of that component can be extruded with the sintered metal batch prior to firing. Subsequently, the seeds may be grown to maturity by any of the methods known to those skilled in the art. Specifically, the methods disclosed in the above cited U.S. patent application, Ser. No. 113, 475 are incorporated herein by reference, as filed. After such treatments the noble metal on high surface area mediums can be applied to the zeolite treated substrate.

Alternatively, two distinct washcoat layers may be provided to the substrate. It is well known to those skilled in the art that washcoat material is a high surface area porous medium. Washcoats of zeolites and noble metals on high surface area oxides can be prepared separately, with no preference for which layer is applied first, and the substrate sequentially separately treated with each washcoat such that a layered sandwich effect is obtained. Due to the porosity of each washcoat both zeolites and noble metals will be accessible to the effluent stream.

It is also new in the art to treat sintered metal substrates with washcoat material. As an embodiment to the present invention it is contemplated, similar to the ceramic washcoat substrates, that high surface area washcoats can be coated on the sintered metal powder substrates. In this manner catalysts can be advantageously applied to the sintered metal powder substrate affixed to the washcoat material. Appropriate washcoats are those, known to those skilled in the art, that have been used for washcoating ceramic materials as well. Particularly useful and preferred for the sintered metal powder substrates, is for the substrate material to be provided with an oxide layer prior to washcoating. In a preferred embodiment containing aluminum, the aluminum metal is first oxidized, either in air or some other oxidizing environment, to form a stable aluminum oxide layer. The aluminum oxide layer creates a more stable interface between the aluminum containing metal substrate and the washcoat. By oxidizing the surface first, the washcoated substrate will demonstrate a longer life in the harsh environments contemplated for the use of the washcoated sintered metal powder substrate.

Finally, either the front end of the substrate can be coated by a noble metal treatment while the back end can be treated with zeolites or two separate substrates can be treated with separate washcoat slurries and placed in series in the effluent. Either of these embodiments will produce a similar result, that result being a catalyzed effluent whereby the exit gases are essentially nitrogen, carbon dioxide, and water.

This result proves advantageous since the noble metal catalyzes reactions of hydrocarbons, carbon monoxide, and nitrogen oxides. For the purposes of the carbon species, the noble metals help transform, by facilitating the oxidation, the reduced carbon species to carbon dioxide and water. The nitrogen oxides, on the other hand, are reduced to either nitrogen gas or ammonia.

A certain synergy is played between the intermediate ammonia and zeolites. Ammonia is an undesired product of noble metal catalysis. The molecular sieve or zeolite provides the arena for the oxidation of ammonia and the apparent contemporaneous reduction of NOx to $N_2$ and $H_2O$. This arena provides a method of oxidizing hydrocarbon, and carbon monoxide species, and reducing nitrogen oxide species comprises the steps of; providing a catalyst system comprised of molecular sieves and a single or a plurality of noble metals wherein said system oxidizes said hydrocarbon and carbon monoxide species, and reduces said nitrogen oxide species, contacting said hydrocarbon and carbon monoxide species with said noble metals, contacting said nitrogen species with said molecular sieves, and producing carbon dioxide, nitrogen gas and water.

The thermal and/or reaction redox environment may determine the per cent yield of ammonia. Therefore, for each catalyst system contemplated, the light off temperature of the system must be considered. The light off temperature is that temperature where efficient reactant combustion takes place. Additionally, the composition of the exhaust stream is relevant to catalyst substrate design.

In the present invention, approximately 1 to 95 weight percent zeolite and 5 to 60 $g/ft^3$ (0.001 to 10 grams per cubic centimeter) of noble metal is most efficiently utilized for automotive exhausts. 1 to 99 weight percent zeolite and 5 to 60 $g/ft^3$ (0.001 to 10 grams per cubic centimeter) of noble metals are contemplated as most useful for power plant exhaust, dependent upon the fuel employed.

In the practice of this invention, the catalysts and/or high surface area oxides are normally supported on relatively inert substrates. The substrates take the shape of honeycombs, slabs, and molded objects of various geometries. The materials of the substrates may be comprised of ceramics such as cordierite, mullite, alumina, lithium aluminosilicates, titania, zircon, feldspars, quartz, fused silica, clays, kaolin clay, aluminum titanate, aluminum titanate solid solutions, silicates, zirconia, spinels, glasses, glass ceramics, aluminates, and mixtures thereof. Additionally, it has been found useful to use substrates comprised of metal powder mixtures such as aluminum, silicon, copper, iron, magnesium, nickel, steel, titanium, stainless steel (including 300 and 400 series), and various alloys of those metals with one another or with other metals such as are present in stainless steels. Additionally, laid-up substrates, which essentially are metal sheets or bodies which may be configured as a substrate for emission control purposes, can be treated with molecular sieves and noble metal catalysts with advantageous results.

The most practical means for producing structures from the above substrate material for supporting the catalysts is to utilize powdered starting materials. Generally, powders having average particle diameters ranging between about 5–200 microns have been found operable. It has been observed that one factor influencing porosity of the final body is the size of the starting components. Powders, preferably should pass through a No. 100 United States Standard Sieve (149 microns) and most preferably, the powders will pass a No. 325 United States Standard Sieve (44 microns).

The general method of producing porous sintered substrates, as one skilled in the art can appreciate, is by mixing batch materials, blending the mixture, forming a green body, and subsequently sintering the green body to a hard porous structure. In the manner of making the body various lubricants, such as zinc stearate and sodium stearate, and organic binders, such as methylcellulose, are added to the batch during the mixing step to provide viscosity control and strength prior to firing and porosity to the after fired structure. Porosity is also dependent upon the raw materials and the firing temperature, the higher the temperature the more dense the resulting structure.

Porosity can be an important component, but is not required, of the structure and should be monitored to practice the more preferred aspects of the invention. To permit access to the catalyst through the walls, total porosity and pore size should be maintained within a certain range. The range of choice may be varied to accommodate the proposed effluent. For catalyst and/or filter type applications, the inventive structures may exhibit a total porosity of about 20–75%, preferably about 20–60%, with pores having diameters ranging about 1–100 microns, preferably about 1–50 microns. These ranges for porosity are applicable to a filtering type operation that may be performed by the same substrate materials, such as in a diesel particulate filter or filters for the exhaust of other organic fueled sources.

The catalysts loading of the structure may be higher after it has been fired if the resultant structure is more porous, thereby increasing the surface area. Zeolites require sites to enable binding to the structure during use in the harsh environments contemplated, if they are to have commercially interesting lifetimes. Additionally, the alumina, whereby the noble metals are sited, needs to be a high surface area porous structure to inhibit sintering of the noble metals and to provide for the accessibility of the noble metals to the exhaust stream.

The present invention substitutes an available resource for a rare resource to solve a problem in the art that has been addressed by the development of TWC catalyst systems. The present invention does not depend exclusively on the use of rhodium in a TWC catalyst system. Instead, the TWC catalyst system relies on a variety of noble metals and molecular sieves, preferably zeolites, wherein some small amount of rhodium can optionally be included to catalyze hydrocarbons, carbon monoxide, and nitrogen oxides. The combination of zeolites and a variety of noble metals is preferred, since separation of rhodium from the other platinum group metals and the separation of any one metal from the other is costly. Normally, the amount of rhodium separated is low compared to the ratios presently used in TWC systems because the concentration in the ore is correspondingly low. The nominal concentration of platinum to rhodium in natural ores is 19:1. By adding zeolites to a TWC system, the expense of separating rhodium from other platinum group metals during ore refinement to thereby enable enrichment of the TWC system with rhodium is eliminated and shortages may be averted. Therefore, with the present invention process and material savings can be realized.

DESCRIPTION OF THE PREFERRED EMBODIMENTS

Figure 1:
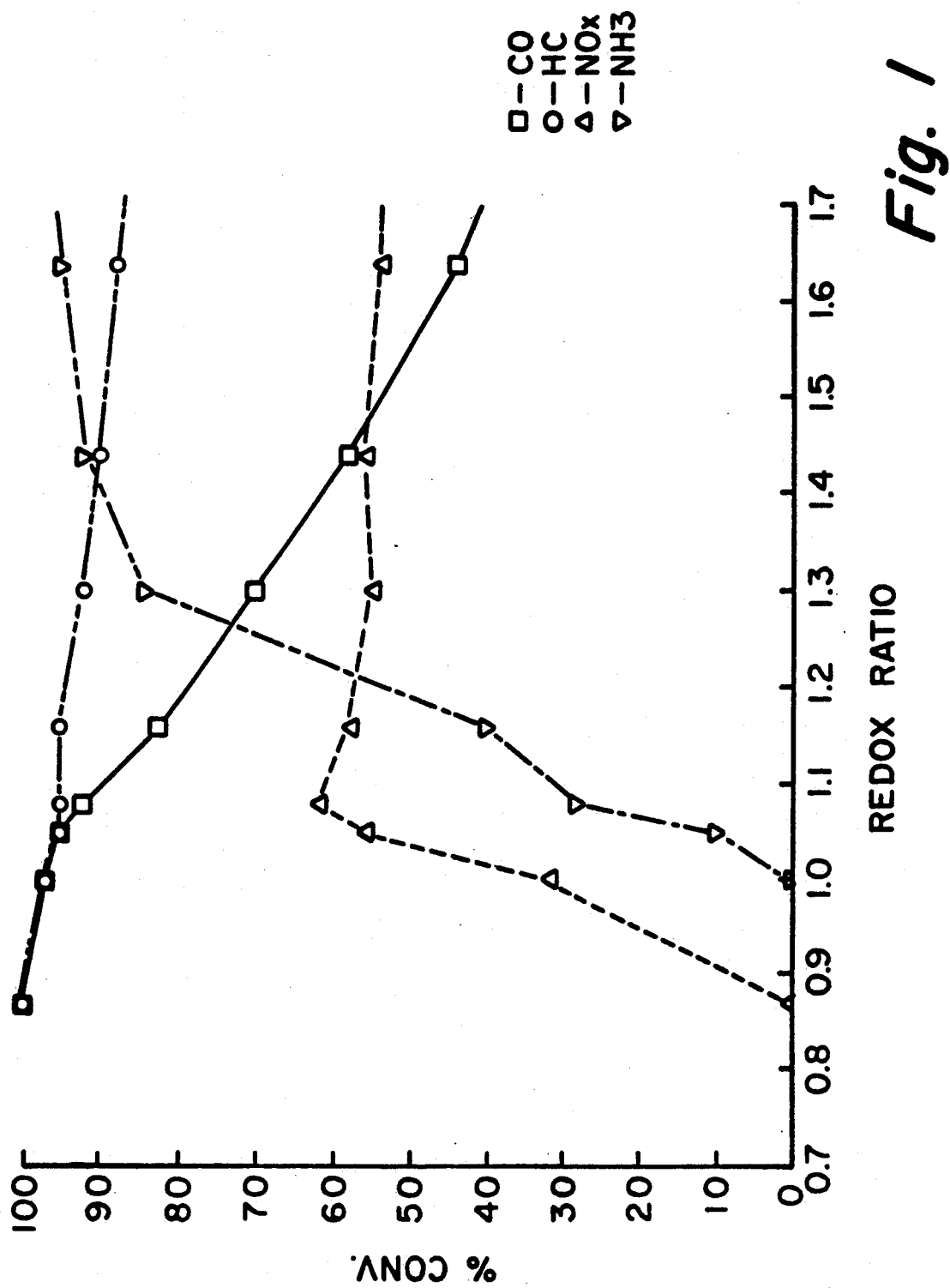
FIG. 1 shows the gas emission results of a catalyst system excluding rhodium.

The following Examples are offered for illustrative purposes. As those skilled in the art will realize from the aggregate effect of the Examples herein disclosed, the present invention has broad implications for use as a catalytic system.

In Example I, 85.7 grams of silicalite zeolite (S-115 from Union Carbide) is mixed with 19.6 grams of pseudoboehmite (Versal —250 from Kaiser Chemicals, now LaRoche Chemicals Inc.) and 100 milliliters of water. The mixture was stirred and the pH of the slurry, originally about pH 8, decreased to about pH 3.7 by the addition of a solution of 1:1 nitric acid:water. About 200 grams of half-inch alumina balls (rolling media) were added to the slurry and rolled overnight on a roller mill. A sample of the slurry was dried and analyzed by x-ray diffraction revealing no loss of zeolite crystallinity.

Pre-weighed honeycomb substrates (Celcor cordierite substrates made by Corning Glass Works, 1 inch diameter×1 inch length or 25 mm×25 mm, 400 cells/square inch or 62 cells/square cm) were dipped into the slurry for about a minute. The substrates where subsequently liberated of excess slurry by shaking. The honeycomb channels were cleared of excess slurry with compressed air. Samples were dried at 65° C. for 16–20 hours and fired at 550° C. for 6 hours. An average weight loading of 16–22% zeolites was observed for these samples.

Samples were then loaded (30 grams per cubic ft or 0.001 grams per cubic centimeter) with platinum metal. Each sample was loaded three times with 2 ml of a 0.226% by weight chloroplatinic acid solution. After each loading the samples were dried in an oven at 65° C. for an hour. After two additional loadings, 6 ml in total, the samples were fired at 550° C. for 6 hours.

The loaded samples were next tested for automotive catalytic activity in a 1 inch (25 mm) bench reactor with simulated automotive gas mixture. The gas mixture consists of 500 ppm of NOx, 300 ppm of propylene, 0.65% by volume CO, 0.2% by volume hydrogen, 0.48% by volume oxygen, 7.7% by volume carbon dioxide, and the balance nitrogen gas. The space velocity of the catalytic reaction was 33,380 ch/hr. The gas conversions were measured as % conversion compared to the inlet concentrations. The temperature of the reactor was slowly raised to 600° C. At a constant 600° C. the oxygen concentration was varied to change the redox ratio. The gas conversion was then monitored as a function of redox ratio. The results are given in Table 1.

TABLE 1

| Redox | % Conversion | | | $NH_3$ as % of |
|---|---|---|---|---|
| Ratio | CO | HC | NOx | NOx Conversion |
| 0.68 | 87.9 | 98.1 | 0.2 | 0.0 |

TABLE 1-continued

| Redox Ratio | % Conversion CO | % Conversion HC | % Conversion NOx | NH₃ as % of NOx Conversion |
|---|---|---|---|---|
| 0.78 | 87.4 | 98.1 | 0.0 | 0.0 |
| 0.85 | 87.9 | 98.0 | 3.6 | 0.0 |
| 0.90 | 87.5 | 98.0 | 11.7 | 0.0 |
| 0.96 | 87.3 | 98.0 | 32.4 | 0.0 |
| 1.03 | 87.3 | 98.0 | 75.3 | 0.0 |
| 1.10 | 80.5 | 97.6 | 98.3 | 0.7 |
| 1.20 | 70.6 | 98.0 | 98.2 | 0.0 |
| 1.32 | 62.0 | 98.0 | 98.5 | 23.8 |
| 1.62 | 45.8 | 97.9 | 98.5 | 66.6 |
| 2.11 | 28.2 | 97.6 | 98.3 | 90.0 |

In Example II, 19.6 grams of dispersible pseudoboehmite (Versal-250 from Kaiser Chemicals), and 100 ml of distilled water were mixed in a 500 ml plastic bottle to form a slurry. The pH was adjusted to 3.7 and the slurry rolled overnight. 85.7 grams of silicalite zeolite (S-115 from Union Carbide) was added to the slurry followed by roll milling for two hours. Samples were again tested for zeolite crystallinity, with favorable results.

Honeycomb substrates were again catalytically loaded with noble metals and zeolites similarly to the method in Example I. The loaded samples were tested for % gas conversion by the same gas mixture and temperature as in Example I. The results are shown in Table 2.

TABLE 2

| Redox Ratio | % Conversion CO | % Conversion HC | % Conversion NOx | NH₃ as % of NOx Conversion |
|---|---|---|---|---|
| 0.68 | 88.5 | 98.0 | 0.0 | 2.6 |
| 0.78 | 88.2 | 98.0 | 0.0 | 2.6 |
| 0.85 | 88.7 | 97.8 | 0.0 | 3.2 |
| 0.90 | 88.6 | 97.5 | 10.2 | 3.0 |
| 0.96 | 88.6 | 97.8 | 33.9 | 3.5 |
| 1.03 | 87.7 | 97.4 | 79.0 | 4.5 |
| 1.10 | 81.2 | 95.9 | 98.2 | 6.7 |
| 1.20 | 73.0 | 95.0 | 98.3 | 16.0 |
| 1.32 | 64.5 | 94.9 | 98.3 | 30.5 |
| 1.61 | 49.3 | 95.5 | 98.4 | 64.8 |
| 2.09 | 32.3 | 96.5 | 98.2 | 86.7 |

In Example III, 85.7 grams of ultrastable Y zeolite (TSZ-390HUA from TOSOH Corporation), 19.6 grams of dispersible pseudoboehmite (Versal-250 from Kaiser Chemicals), and 140 ml of distilled water were mixed. The pH of the slurry was adjusted to 3.8. The zeolite slurry was rolled and analyzed as in Example I.

Honeycomb samples were catalyst loaded and tested as in Example I. The results of the % gas conversion of these samples are shown in Table 3.

TABLE 3

| Redox Ratio | % Conversion CO | % Conversion HC | % Conversion NOx | NH₃ as % of NOx Conversion |
|---|---|---|---|---|
| 0.68 | 86.7 | 98.6 | 3.3 | 4.9 |
| 0.76 | 86.5 | 98.9 | 4.2 | 4.3 |
| 0.85 | 86.4 | 98.9 | 7.8 | 4.9 |
| 0.90 | 86.1 | 99.0 | 14.7 | 4.0 |
| 0.96 | 86.4 | 99.0 | 33.3 | 4.9 |
| 1.02 | 86.4 | 99.1 | 72.2 | 7.0 |
| 1.10 | 81.0 | 98.6 | 99.3 | 8.6 |
| 1.20 | 69.3 | 97.5 | 99.5 | 13.0 |
| 1.32 | 59.1 | 97.4 | 99.5 | 25.5 |
| 1.61 | 42.5 | 97.8 | 99.5 | 59.7 |
| 2.09 | 25.3 | 98.4 | 99.1 | 88.2 |

In Example IV, the same proportions and compositions as in Example III were mixed. Samples of honeycombs were catalyst loaded as in Example I and tested for % gas conversion. The results are shown in Table 4.

TABLE 4

| Redox Ratio | % Conversion CO | % Conversion HC | % Conversion NOx | NH₃ as % of NOx Conversion |
|---|---|---|---|---|
| 0.68 | 87.3 | 98.4 | 2.1 | 1.7 |
| 0.75 | 86.9 | 98.3 | 2.6 | 1.0 |
| 0.85 | 87.0 | 98.4 | 6.3 | 1.3 |
| 0.90 | 86.3 | 98.4 | 14.6 | 1.8 |
| 0.96 | 86.7 | 98.4 | 34.4 | 2.0 |
| 1.03 | 86.9 | 98.4 | 71.3 | 5.1 |
| 1.10 | 81.2 | 98.4 | 98.4 | 6.6 |
| 1.20 | 70.3 | 95.2 | 98.9 | 5.8 |
| 1.31 | 60.6 | 95.3 | 98.6 | 22.8 |
| 1.62 | 43.5 | 95.1 | 98.6 | 55.2 |
| 2.08 | 26.6 | 96.9 | 98.1 | 87.9 |

In Example V, large honeycomb substrates (Celcor cordierite substrates made by Corning Glass Works, 3.2 inch ×5.7 inch (81.3 mm×144.8 mm) oval shape×4.98 inch length (126.5 mm), 400 cells per square inch or 62 cells per square centimeter) were coated with silicalite zeolite (S-115 from Union Carbide) and alumina by Prototech Company (Newton, Mass.). The samples had an average washcoat loading of 20–23% by weight. The washcoat composition was 6 parts silicalite to 1 part alumina binder. The samples had been heat treated in air for 2 hours. Smaller size samples (1×1 inch or 25 mm×25 mm) were core drilled from the large oval shaped washcoated samples for testing.

Samples were coated with noble metals and tested for % gas conversion as in Example I. The results of these tests are in Table 5.

TABLE 5

| Redox Ratio | % Conversion CO | % Conversion HC | % Conversion NOx | NH₃ as % of NOx Conversion |
|---|---|---|---|---|
| 0.80 | 96.5 | 99.6 | 22.7 | 7.5 |
| 0.85 | 96.3 | 99.5 | 31.0 | 8.2 |
| 0.90 | 95.9 | 99.6 | 42.8 | 7.6 |
| 0.96 | 95.8 | 99.5 | 61.1 | 13.2 |
| 1.03 | 96.1 | 99.3 | 89.0 | 8.6 |
| 1.10 | 79.7 | 99.3 | 99.5 | 9.3 |
| 1.21 | 70.1 | 99.1 | 99.6 | 8.2 |
| 1.31 | 60.7 | 99.1 | 99.6 | 4.1 |
| 1.45 | 58.7 | 99.1 | 99.9 | 15.8 |
| 1.62 | 49.3 | 99.1 | 99.7 | 17.2 |
| 2.09 | 33.6 | 99.1 | 99.9 | 26.4 |
| 2.96 | 15.5 | 99.3 | 100.0 | 23.6 |

In Example VI, samples were made as in Example V. The difference in these Examples derived from coating Example VI with a palladium noble metal in place of the platinum noble metal as in Example V.

Samples were then tested under the same conditions as in Example I. The results of the % gas conversion are shown in Table 6.

TABLE 6

| Redox Ratio | % Conversion CO | % Conversion HC | % Conversion NOx | NH₃ as % of NOx Conversion |
|---|---|---|---|---|
| 0.90 | 88.9 | 98.9 | 0.0 | 5.3 |
| 0.96 | 88.6 | 98.9 | 4.4 | 5.9 |
| 1.03 | 88.4 | 99.0 | 84.5 | 6.3 |
| 1.10 | 82.0 | 98.9 | 99.1 | 5.9 |
| 1.21 | 62.2 | 98.8 | 99.6 | 6.8 |
| 1.31 | 52.9 | 98.6 | 99.4 | 7.0 |
| 1.45 | 44.9 | 98.8 | 99.7 | 9.2 |
| 1.84 | 28.6 | 98.8 | 99.7 | 15.3 |
| 2.47 | 12.5 | 98.6 | 99.9 | 26.3 |
| 3.82 | 0.0 | 98.3 | 99.9 | 49.5 |

In Example VII, samples were made as in Example V. The difference in Example VII and Example V derives from loading a mixture of platinum and palladium metals on the Example VII substrates. Additionally, the after catalyst loaded samples of Example VII were aged at 900° C. for 20 hours in 1% oxygen, 10% water vapor, and the balance nitrogen.

Samples were then tested under the same conditions as in Example I. The results of the % gas conversion are shown in Table 7.

TABLE 7

| Redox Ratio | % Conversion | | | NH3 as % of NOx Conversion |
|---|---|---|---|---|
| | CO | HC | NOx | |
| 0.68 | 92.9 | 98.5 | 2.4 | 0.0 |
| 0.76 | 92.5 | 98.9 | 2.3 | 0.0 |
| 0.85 | 92.4 | 98.9 | 2.3 | 0.0 |
| 0.90 | 92.1 | 98.8 | 2.9 | 0.0 |
| 0.96 | 92.3 | 98.9 | 7.9 | 0.0 |
| 1.03 | 92.5 | 99.1 | 68.9 | 0.0 |
| 1.10 | 84.4 | 99.0 | 89.4 | 0.0 |
| 1.20 | 75.1 | 99.0 | 97.1 | 0.0 |
| 1.31 | 65.4 | 99.1 | 96.8 | 3.9 |
| 1.61 | 45.5 | 98.8 | 95.6 | 11.0 |
| 2.09 | 27.2 | 98.6 | 89.9 | 25.9 |

Example VIII samples were prepared similarly to Example VII except that Example VIII samples were zeolite loaded to 15-16% by weight and were not aged prior to the % gas conversion test. The honeycombs were of a mullite composition.

Samples were then tested under the same conditions as in Example I. The results of the % gas conversion are shown in Table 8.

TABLE 8

| Redox Ratio | % Conversion | | | NH3 as % of NOx Conversion |
|---|---|---|---|---|
| | CO | HC | NOx | |
| 0.68 | 88.7 | 99.5 | 0.0 | 1.2 |
| 0.75 | 89.1 | 99.9 | 0.0 | 1.2 |
| 0.84 | 88.9 | 99.5 | 0.0 | 1.3 |
| 0.90 | 89.1 | 99.4 | 1.0 | 1.9 |
| 0.96 | 88.7 | 99.4 | 13.5 | 2.2 |
| 1.03 | 88.4 | 99.6 | 77.6 | 2.2 |
| 1.09 | 80.9 | 99.1 | 89.8 | 4.7 |
| 1.21 | 70.2 | 97.1 | 93.5 | 1.2 |
| 1.31 | 61.0 | 99.3 | 94.8 | 9.7 |
| 1.45 | 50.9 | 99.3 | 95.3 | 19.2 |
| 1.62 | 42.3 | 99.4 | 95.9 | 35.3 |
| 2.12 | 26.0 | 99.5 | 96.5 | 69.5 |

In Example IX, 85.7 grams of mordenite zeolite was mixed as in Example II. The honeycomb samples were loaded with 6-8% by weight zeolite and binder as in Example II. The honeycombs were then processed according to the method of Example I, further catalyzed with platinum metal.

Samples were then tested under the same conditions as in Example I. The results of the % gas conversion are shown in Table 9.

TABLE 9

| Redox Ratio | % Conversion | | | NH3 as % of NOx Conversion |
|---|---|---|---|---|
| | CO | HC | NOx | |
| 0.68 | 86.8 | 99.6 | 0.0 | 2.8 |
| 0.76 | 86.8 | 99.7 | 0.0 | 3.2 |
| 0.85 | 87.5 | 99.6 | 0.0 | 3.1 |
| 0.90 | 87.3 | 99.5 | 0.4 | 3.9 |
| 0.96 | 88.0 | 99.5 | 19.6 | 3.2 |
| 1.03 | 86.5 | 99.5 | 61.5 | 4.8 |
| 1.11 | 80.0 | 98.9 | 97.6 | 10.8 |
| 1.20 | 70.7 | 93.7 | 97.5 | 7.4 |
| 1.31 | 61.3 | 95.4 | 98.1 | 25.7 |

TABLE 9-continued

| Redox Ratio | % Conversion | | | NH3 as % of NOx Conversion |
|---|---|---|---|---|
| | CO | HC | NOx | |
| 1.44 | 51.3 | 97.4 | 97.5 | 41.1 |
| 1.61 | 42.6 | 98.1 | 97.5 | 55.5 |
| 2.09 | 24.1 | 97.7 | 96.9 | 77.7 |

In Example X, 85.7 grams of HL powder zeolite was combined according to the method in Example I. The sample was then processed similarly to Example I, except the zeolite loading was 7-8% by weight. Platinum catalyst was added and the samples fired.

The samples were then tested under the same conditions as in Example I. The results of the % gas conversion are shown in Table 10.

TABLE 10

| Redox Ratio | % Conversion | | | NH3 as % of NOx Conversion |
|---|---|---|---|---|
| | CO | HC | NOx | |
| 0.68 | 85.6 | 97.1 | 0.0 | 1.2 |
| 0.76 | 85.8 | 96.5 | 0.0 | 1.0 |
| 0.85 | 85.9 | 95.6 | 0.0 | 1.0 |
| 0.90 | 85.6 | 95.3 | 0.0 | 2.3 |
| 0.96 | 85.4 | 94.9 | 21.8 | 2.3 |
| 1.03 | 85.2 | 94.4 | 73.2 | 2.3 |
| 1.11 | 77.1 | 93.6 | 93.6 | 4.5 |
| 1.21 | 70.9 | 89.6 | 92.6 | 0.6 |
| 1.32 | 61.2 | 89.5 | 92.6 | 2.0 |
| 1.61 | 44.2 | 89.9 | 93.8 | 32.9 |
| 2.10 | 29.0 | 90.3 | 94.1 | 63.4 |

In Example XI, 85.7 grams of Ultrastable Y type zeolite was mixed according to the method of Example I. The loading in the sample was 19-23% by weight. Platinum was chosen as the noble metal catalyst.

The samples were then tested under the same conditions as in Example I. The results of the % gas conversion are shown in Table 11.

TABLE 11

| Redox Ratio | % Conversion | | | NH3 as % of NOx Conversion |
|---|---|---|---|---|
| | CO | HC | NOx | |
| 0.68 | 81.2 | 95.0 | 0.4 | 0.0 |
| 0.76 | 81.2 | 94.2 | 2.3 | 0.0 |
| 0.85 | 81.1 | 93.4 | 7.5 | 0.0 |
| 0.90 | 81.1 | 93.3 | 15.0 | 0.0 |
| 0.96 | 80.9 | 93.7 | 28.9 | 0.0 |
| 1.03 | 80.7 | 93.1 | 67.3 | 0.0 |
| 1.10 | 75.0 | 92.8 | 86.8 | 0.9 |
| 1.21 | 64.1 | 87.7 | 87.1 | 0.0 |
| 1.32 | 56.1 | 87.0 | 87.1 | 0.0 |
| 1.62 | 41.2 | 86.1 | 87.5 | 27.7 |
| 2.10 | 27.5 | 85.3 | 87.8 | 60.0 |

In example XII, the samples were prepared as in Example XI, except that the zeolite loading was 12-14%. The samples were then tested under the same conditions as in Example I. The results of the % gas conversion are shown in Table 12.

TABLE 12

| Redox Ratio | % Conversion | | | NH3 as % of NOx Conversion |
|---|---|---|---|---|
| | CO | HC | NOx | |
| 0.68 | 86.2 | 57.5 | 0.0 | 0.0 |
| 0.76 | 86.4 | 69.6 | 0.0 | 0.0 |
| 0.85 | 86.2 | 67.0 | 1.4 | 0.0 |
| 0.90 | 85.8 | 97.8 | 9.3 | 0.0 |
| 0.96 | 85.7 | 96.5 | 28.2 | 0.0 |
| 1.03 | 86.8 | 95.5 | 76.3 | 0.0 |
| 1.11 | 78.4 | 91.0 | 97.9 | 1.4 |
| 1.20 | 68.3 | 41.6 | 98.1 | 0.0 |
| 1.32 | 59.6 | 44.8 | 98.6 | 8.5 |

TABLE 12-continued

| Redox Ratio | % Conversion | | | NH3 as % of NOx Conversion |
|---|---|---|---|---|
| | CO | HC | NOx | |
| 1.62 | 42.5 | 44.5 | 98.8 | 34.2 |
| 1.62 | 43.3 | 47.4 | 98.9 | 45.9 |
| 2.07 | 27.7 | 52.6 | 98.9 | 76.1 |

In Example XIII, H-offretite zeolite was the substituted zeolite and was loaded from 7 to 13% by weight. The samples were then tested under the same conditions as in Example I. The results of the % gas conversion are shown in Table 13.

TABLE 13

| Redox Ratio | % Conversion | | | NH3 as % of NOx Conversion |
|---|---|---|---|---|
| | CO | HC | NOx | |
| 0.68 | 83.5 | 90.3 | 0.1 | 1.9 |
| 0.76 | 83.4 | 90.3 | 2.5 | 2.3 |
| 0.85 | 83.5 | 90.5 | 5.2 | 2.4 |
| 0.90 | 83.6 | 89.8 | 10.6 | 3.3 |
| 0.96 | 82.6 | 89.2 | 23.9 | 2.9 |
| 1.03 | 83.3 | 87.6 | 63.7 | 3.4 |
| 1.11 | 77.1 | 85.5 | 84.8 | 6.1 |
| 1.20 | 68.3 | 78.2 | 84.5 | 3.7 |
| 1.31 | 59.1 | 78.1 | 85.4 | 13.7 |
| 1.61 | 44.1 | 75.8 | 85.4 | 36.3 |
| 2.09 | 29.6 | 75.3 | 86.8 | 65.7 |

In Example XIV, samples were prepared similarly to Example I, except that a platinum to rhodium concentration of 19:1 was coated on the substrate. This concentration is the ratio commonly found in nature. The remaining processing of the substrate was the same as Example I.

The samples were then tested under the same conditions as in Example I. The results of the % gas conversion are shown in Table 14.

TABLE 14

| Redox Ratio | % Conversion | | | NH3 as % of NOx Conversion |
|---|---|---|---|---|
| | CO | HC | NOx | |
| 0.7 | 86.2 | 97.5 | 0.0 | 0.4 |
| 0.8 | 85.7 | 98.8 | 0.9 | 1.8 |
| 0.8 | 85.7 | 97.5 | 0.0 | 1.7 |
| 0.8 | 86.2 | 97.0 | 9.2 | 0.7 |
| 0.8 | 85.7 | 98.8 | 12.7 | 1.5 |
| 0.9 | 85.8 | 96.4 | 22.3 | 2.8 |
| 0.9 | 85.6 | 98.3 | 26.4 | 3.3 |
| 1.0 | 85.6 | 98.1 | 48.7 | 3.3 |
| 1.0 | 86.6 | 95.6 | 46.4 | 3.2 |
| 1.0 | 86.0 | 98.0 | 84.8 | 4.4 |
| 1.1 | 79.0 | 96.8 | 100.0 | 5.3 |
| 1.2 | 67.7 | 87.9 | 99.4 | 1.5 |
| 1.3 | 58.5 | 89.6 | 99.8 | 3.8 |
| 1.6 | 40.7 | 90.5 | 99.8 | 15.2 |
| 2.1 | 23.0 | 91.5 | 99.9 | 30.4 |

In Example XV, an extruded and sintered metal monolith honeycomb, prepared according to the method disclosed in U.S. Pat. No. 4,758,272 incorporated herein by reference, (1.7 cm diameter by 1.8 cm length) was pre-oxidized at 1000° C. for 24 hours. The sample was washcoated with alumina and ceria by dipping in a slurry comprised of 93 grams of Versal-GH (from Kaiser Chemicals), 7 grams of dispersible ceria (from Molycorp) 70 ml of water, and 3 ml of dilute (1:1 ratio) of nitric acid. The viscosity of the slurry was 34 cps and the dipping time was for one minute. The excess slurry was shaken off from the honeycomb and the honeycomb channels were cleared by blowing with compressed air. The sample was dried in an oven at 100° C. for an hour followed by firing at 550° C. for 6 hours.

The sample was subsequently loaded with 30 grams of platinum and rhodium (5:1 ratio) per cubic foot (0.001 gram/cm$^3$).

The sample was tested for automotive catalytic activity as explained in Example I. The results of the catalytic conversion are given in Table 15.

TABLE 15

| Redox Ratio | % Conversion | | | NH3 as % of NOx Conversion |
|---|---|---|---|---|
| | CO | HC | NOx | |
| 0.79 | 86.3 | 99.0 | 2.0 | 0.0 |
| 0.84 | 86.0 | 98.9 | 7.6 | 0.0 |
| 0.90 | 85.9 | 98.6 | 16.9 | 0.0 |
| 0.97 | 85.8 | 98.5 | 36.8 | 0.0 |
| 1.09 | 85.6 | 98.5 | 71.3 | 0.0 |
| 1.15 | 86.3 | 97.1 | 96.8 | 0.0 |
| 1.26 | 81.1 | 96.7 | 96.9 | 0.0 |
| 1.42 | 75.4 | 96.1 | 97.3 | 0.0 |
| 1.86 | 62.4 | 94.5 | 98.4 | 0.0 |

In Example XVI, a sintered metal powder substrate was prepared as in Example XV and was pre-oxidized at 1000° C. for 5 hours. Pre-oxidized and samples that were unoxidized were washcoated with alumina and ceria by dipping in a slurry comprised of 574.2 grams of Versal-GH (from Kaiser Chemicals), 43.2 grams of ceria (from Rhone-Poulen), 432 ml of water, 20 ml of dilute (1:1) nitric acid. The viscosity of the slurry was 106 cps, the samples were treated for one minute. The excess slurry was shaken off from the substrate, followed by blowing compressed air through the channels. Samples were dried in an oven at 100° C. for an hour followed by firing at 550° C. for 6 hours. Washcoat loading of 15-25 weight percent was observed. The samples were next loaded with 35 to 50 grams of platinum per cubic foot (0.001-0.002 grams/cm$^3$). The samples were then fired at 550° C. for 6 hours. A second layer of zeolite and alumina was coated similar to the method of Example I. 13-15 weight percent loading of zeolite was observed. It is noted that the pre-oxidized sample produced a more stable, less likely to flake off, washcoat to substrate interface.

In Example XVII, a metal powder batch material can be mixed comprising an iron-aluminum alloy (from Shieldalloy Corp.), consisting of 50-50 Fe to Al ratio, similar to the samples disclosed in U.S. Pat. No. 4,758,272. The sample can be mixed with zeolite seeds, in particular silicalite. The metal powder batch and silicalite can then be mixed for 30 minutes to insure homogeneity, mixed with a binder material, such as 8 weight percent methyl cellulose, for porosity, subsequently extruded, and then dried at 100° C. The dried zeolite treated substrate can then be fired at 1000° C. to provide a harden structure. This structure is then treated with hydrothermal treatment, according to the methods disclosed in the before mentioned U.S. patent application Ser. No. 113,475, to grow the zeolite seeds. Once the seeds have matured, the substrate can then be washcoated with a platinum and/or palladium high surface area coating. The catalytic composite can then be heat treated and used as a TWC system.

Figure 2:
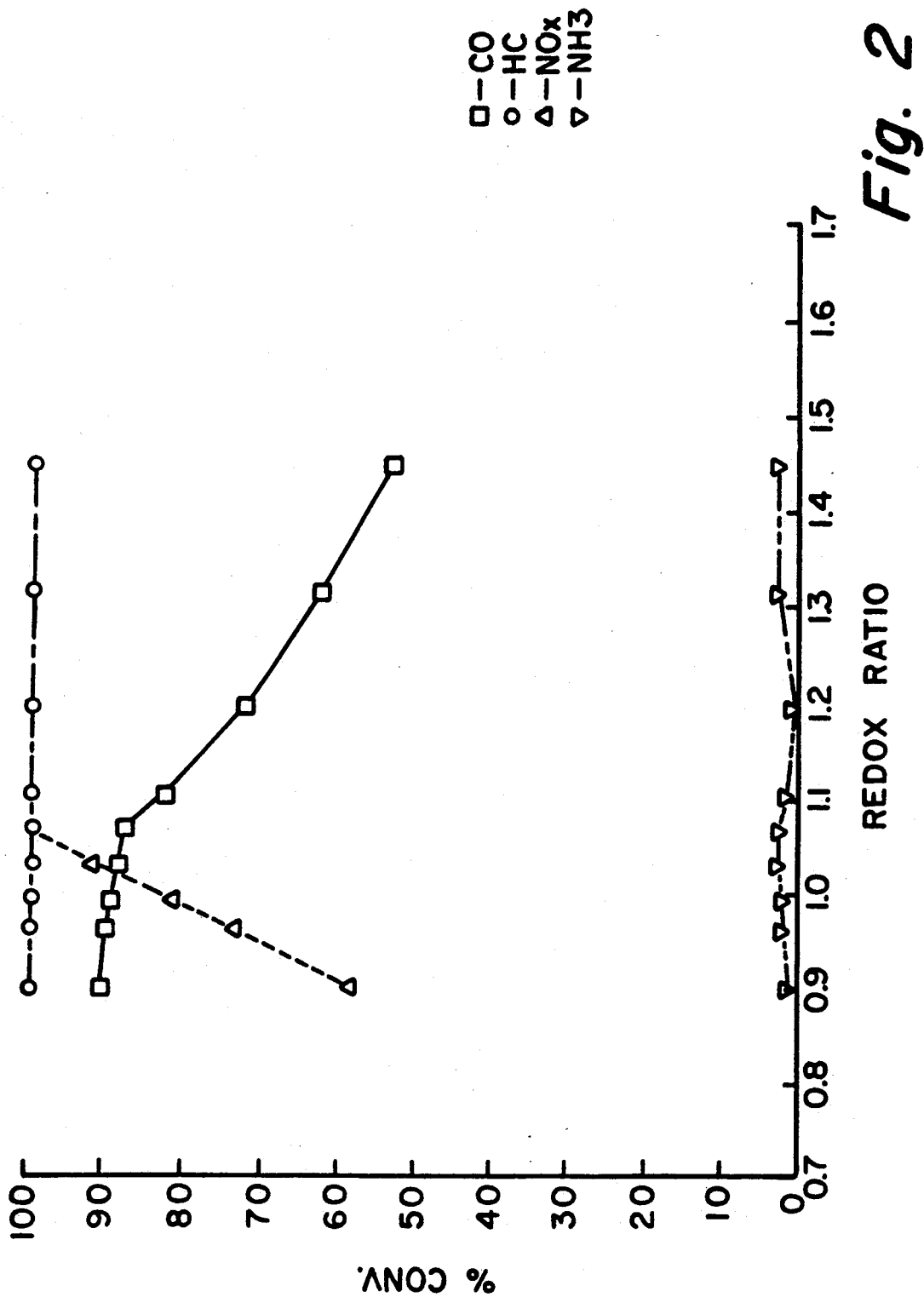
FIG. 2 shows the gas emission results of a catalyst system including rhodium.
Figure 3:
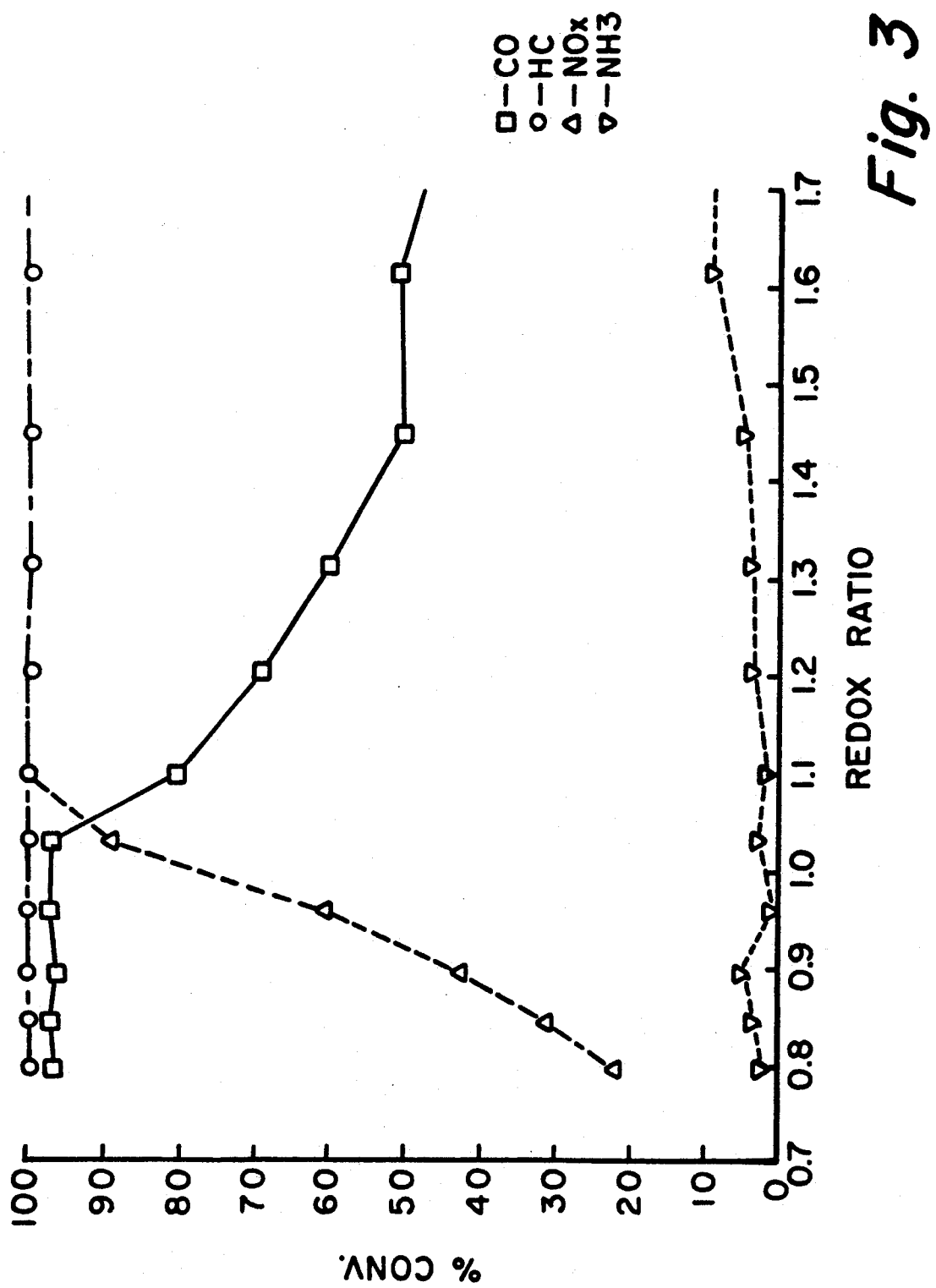
FIG. 3 shows the gas emission results of a catalyst system excluding rhodium and including molecular sieves.

FIGS. 1, 2, and 3 are illustrative of the differences between the TWC catalyst system already known in the art and that of the present invention.

FIG. 1, taken from an open literature publication (see Gandhi et al., ACS Symposium Series No. 178; 1982, Catalysts Under Transient Conditions, pp. 143-162), is an example of a catalyst system without the availability of a catalyst species able to catalyze NOx to nitrogen gas. At a redox ratio of 1.00 the gas mixture to be catalyzed is neither oxidizing nor reducing. In FIG. 1, as the redox ratio increases from the oxidizing value of 0.87, NOx starts to convert to $N_2$ and $H_2O$. As the ratio reaches 1.00 ammonia starts to form as well as $N_2$ and $H_2O$ from the reacting NOx. Finally, at redox ratios above about 1.3 NOx is converted to approximately 100% ammonia instead of $N_2$ and $H_2O$. The formation of a new pollutant, ammonia, is an undesirable result.

FIG. 2 is essentially the same catalyst system as in FIG. 1, only rhodium is present. In the presence of rhodium, negligible ammonia is produced in either the reducing or oxidizing environments. Additionally, as the redox ratio reaches about 1.08 the conversion of NOx to $N_2$ and $H_2O$ reaches approximately 100% and maintains that level of conversion with increasing redox ratio, i.e. higher reducing potential. The broad range 0.9 to 1.10 may be considered as an operating window wherein all three pollutants, NOx, CO, and HC are substantially converted to $N_2$, $CO_2$, and $H_2O$.

FIG. 3 represents the results of tests similar to FIG. 1 and FIG. 2, except that the catalyst system tested is an embodiment of the present invention (Example V). A mixture of zeolite, platinum, and alumina binder comprises the catalyst system. The results of FIG. 3 and FIG. 2 track very closely, both for catalysis of carbon and nitrogen species. This clearly indicates that zeolites are capable of substituting for a great portion of the rhodium, or in this particular case, altogether.

Clearly, the results presented in Examples I through XIV illustrate that molecular sieves are every bit as efficient a replacement of rhodium in the catalyst system presented herein. The best mode contemplated by the inventors is that of Example XIV. While the performance of Example XIV is better with regards to NOx conversion and production of ammonia, the obvious reason for this composition being the most preferred is for commercial purposes. Rhodium does not have to be separated from the platinum metal source for this embodiment. As a consequence economies can be realized on many levels of production.

What is claimed:

1. A three way catalyst (TWC) system that can be used for the removal of hydrocarbons, carbon monoxide and oxides of nitrogen from waste gas, the TWC system comprising a substrate supporting a catalyst, the catalyst comprising a washcoat consisting of:
   (1) zeolite selected from the group consisting of ZSM zeolite and silicalite, the zeolite mixed with high surface area oxide, and
   (2) salt solution of a noble metal, the noble metal selected from the group consisting of platinum and palladium,
the washcoat being characterized in that substantially all of the noble metal is sited on the high surface area oxide such that both the noble metal and the zeolite are available to catalyze reactants in the waste gas most suited for their respective properties.

2. The TWC system of claim 1, wherein the catalyst consists essentially of 1-95 wt. % zeolite, the balance being high surface area oxide and noble metal.

3. The TWC system of claim 1, wherein the catalyst consists of 5-60 g/ft3 noble metal, the balance being high surface area oxide and zeolite.

4. The TWC system of claim 1, wherein the zeolite is grown on seeds and integrally supported by the substrate.

5. The TWC system of claim 1, wherein the substrate is a ceramic honeycomb selected from a group consisting of: cordierite, mullite, alumina, lithium aluminosilicate, titania, zircon, feldspar, quartz, fused silica, clay, aluminum titanate solid solution, silicate, aluminate, zirconia, spinel, glass, glass-ceramic and a combination thereof.

6. The TWC system of claim 1, wherein the substrate is a metal honeycomb.

7. The TWC system of claim 6, wherein the metal is pre-oxidized.

8. The TWC system of claim 6, wherein the substrate is formed of a sintered metal powder selected from a group consisting of aluminum, copper, iron, magnesium, nickel, silicon, steel, titanium, stainless steel and alloys of these metals.

9. The TWC system of claim 1, wherein surface area oxide is selected from the group consisting of hydrolyzed aluminum alkoxide, aluminum chlorhydrate, silica, alumina, zirconia, spinel, silica and titania.

10. The TWC system of claim 9, wherein the high surface area oxide is a pseudo-boehmite alumina which has been converted to gamma alumina by firing in the range of 500° to 600° C.

11. The TWC system of claim 1, wherein the washcoat comprises alumina and silicalite in the silicalite to alumina ratio in the range of 4:1 to 6:1.

12. A method of producing the TWC system of claim 1 comprising:
   providing a substrate, a high surface area oxide binder, a zeolite, and solution of a noble metal salt;
   forming a washcoat on the substrate by a technique selected from the group consisting of:
      A) mixing the zeolite with the high surface area oxide binder to form a slurry, coating the substrate with the slurry, heat treating the slurry-treated substrate in a temperature range of 500° to 600° C., and applying the salt solution of the noble metal to the heat treated substrate; and
      B) mixing the zeolite with some of the high surface area oxide binder to form a first slurry,
         mixing the noble metal salt solution with the remaining high surface area oxide binder to form a second slurry,
         heat treating the second slurry,
         mixing the heat treated second slurry with the first slurry to form a third slurry,
         coating the substrate with the third slurry, and
         heat treating the slurry treated substrate in a temperature range of 500° to 600° C.

13. The method of claim 12, wherein the washcoat is formed using technique A.

14. The method of claim 13, wherein the substrate is formed of sintered metal powder.

15. The method of claim 14, wherein the sintered metal powder substrate is provided with a compatible surface oxide layer.

16. The method of claim 15, wherein the surface oxide is selected from the group consisting of aluminum oxide, titanium oxide, and silicon oxide.

17. The method of claim 12, wherein the washcoat is formed using technique B.

18. The method of claim 17, wherein the substrate is formed of sintered metal powder.

19. The method of claim 18, wherein the sintered metal powder substrate is provided with a compatible surface oxide layer.

20. The method of claim 19, wherein the surface oxide is selected from the group consisting of aluminum oxide, titanium oxide, and silicon oxide.

UNITED STATES PATENT AND TRADEMARK OFFICE
CERTIFICATE OF CORRECTION

PATENT NO. :  5,244,852
DATED     :  September 14, 1993
INVENTOR(S) :  Irwin M. Lachman et al.

It is certified that error appears in the above-identified patent and that said Letters Patent is hereby corrected as shown below:

Col. 2, line 43, "5-30%" should be "15-30%"

Col. 14, line 15, "the high" should be inserted after "wherein"

Signed and Sealed this

Thirty-first Day of May, 1994

Attest:

BRUCE LEHMAN

Attesting Officer

Commissioner of Patents and Trademarks